United States Patent
Augustsson et al.

(10) Patent No.: US 12,060,915 B2
(45) Date of Patent: Aug. 13, 2024

(54) BRAKE DRUM SYSTEM FOR A WHEEL OF A VEHICLE

(71) Applicant: Volvo Truck Corporation, Gothenburg (SE)

(72) Inventors: Kent Augustsson, Bollebygd (SE); Ramachandran Sandrasekaran, Karnataka (IN); Luiz Paulo Abreu, Gothenburg (SE); Boopathy Mani, Vijinapura (IN)

(73) Assignee: Volvo Truck Corporation, Gothenburg (SE)

( * ) Notice: Subject to any disclaimer, the term of this patent is extended or adjusted under 35 U.S.C. 154(b) by 410 days.

(21) Appl. No.: 17/614,019

(22) PCT Filed: May 28, 2020

(86) PCT No.: PCT/EP2020/064867
§ 371 (c)(1),
(2) Date: Nov. 24, 2021

(87) PCT Pub. No.: WO2020/245028
PCT Pub. Date: Dec. 10, 2020

(65) Prior Publication Data
US 2022/0235834 A1    Jul. 28, 2022

(30) Foreign Application Priority Data

Jun. 4, 2019  (IN) .............................. 201941022227

(51) Int. Cl.
*F16D 65/10*    (2006.01)
*B60B 27/00*    (2006.01)
*F16D 65/02*    (2006.01)

(52) U.S. Cl.
CPC .......... *F16D 65/10* (2013.01); *B60B 27/0057* (2013.01); *F16D 2065/1364* (2013.01);
(Continued)

(58) Field of Classification Search
CPC ................. B60B 27/0057; F16D 65/10; F16D 2065/1364; F16D 2065/1384; F16D 2065/1396
(Continued)

(56) References Cited

U.S. PATENT DOCUMENTS 3,027,980 A      4/1962  Burkman
5,890,567 A *    4/1999  Pete ........................ B60B 27/02
                                                      301/6.6
(Continued)

FOREIGN PATENT DOCUMENTS

CN      1312894 A     9/2001
DE      2513914 A1   10/1975
(Continued)

OTHER PUBLICATIONS

International Search Report and Written Opinion for International Patent Application No. PCT/EP2020/064867, mailed Aug. 26, 2020, 14 pages.
(Continued)

*Primary Examiner* — Kip T Kotter
(74) *Attorney, Agent, or Firm* — Withrow & Terranova, PLLC

(57) ABSTRACT

A brake drum system (100) for a wheel of a vehicle, comprising a brake drum (110) rotatable with the wheel, the brake drum having an inner surface (124) adapted to receive a friction-generating lining when a driver applies the brakes of the vehicle; a wheel end hub (112) adapted to be located radially between a drive axle of the vehicle and the brake drum (110); and a substantially circular spring element (102) for concentrically aligning the brake drum (110) with the wheel end hub (112), the spring element being adapted to be clamped between the brake drum and the wheel end hub for providing a radially directed spring force, wherein the spring (Continued)

element has an outer surface adapted to be pressed against the brake drum and an inner surface adapted to be pressed against the wheel end hub.

17 Claims, 14 Drawing Sheets

(52) U.S. Cl.
CPC ................ *F16D 2065/1384* (2013.01); *F16D 2065/1396* (2013.01)

(58) Field of Classification Search
USPC .................... 301/6.6; 188/206 R, 218 R, 265
See application file for complete search history.

(56) References Cited

U.S. PATENT DOCUMENTS

| | | | | |
|---|---|---|---|---|
| 6,139,215 A | * | 10/2000 | Kuhne | ................ F16D 65/123 403/336 |
| 6,145,632 A | * | 11/2000 | Rutter | ................ F16D 65/123 188/18 R |
| 6,330,937 B1 | * | 12/2001 | Dagh | ................ F16D 65/123 188/218 XL |
| 7,610,999 B2 | * | 11/2009 | Sadanowicz | ............ B60B 27/00 188/218 XL |
| 2005/0145452 A1 | | 7/2005 | Yamamoto | |
| 2006/0283644 A1 | | 12/2006 | Matsueda | |
| 2007/0045066 A1 | | 3/2007 | Sadanowicz | |
| 2017/0074336 A1 | * | 3/2017 | Burgoon | ................ F16D 65/123 |
| 2019/0078632 A1 | * | 3/2019 | Burris | ................. B60B 27/0052 |

FOREIGN PATENT DOCUMENTS

| | | | |
|---|---|---|---|
| DE | 102005016338 A | 10/2006 | |
| FR | 2351804 A | 7/1905 | |
| GB | 747155 A | 3/1956 | |
| KR | 1020080037894 A | 5/2008 | |
| WO | WO-2004109141 A1 * | 12/2004 | ........... F16D 65/123 |
| WO | 2014160888 A1 | 10/2014 | |

OTHER PUBLICATIONS

First Office Action for Chinese Patent Application No. 202080040384.3, mailed Nov. 23, 2023, 14 pages.
Second Office Action for Chinese Patent Application No. 202080040384.3, mailed Apr. 7, 2024, 13 pages.
Intention to Grant for European Patent Application No. 20731409.7, mailed May 17, 2024, 39 pages.

* cited by examiner

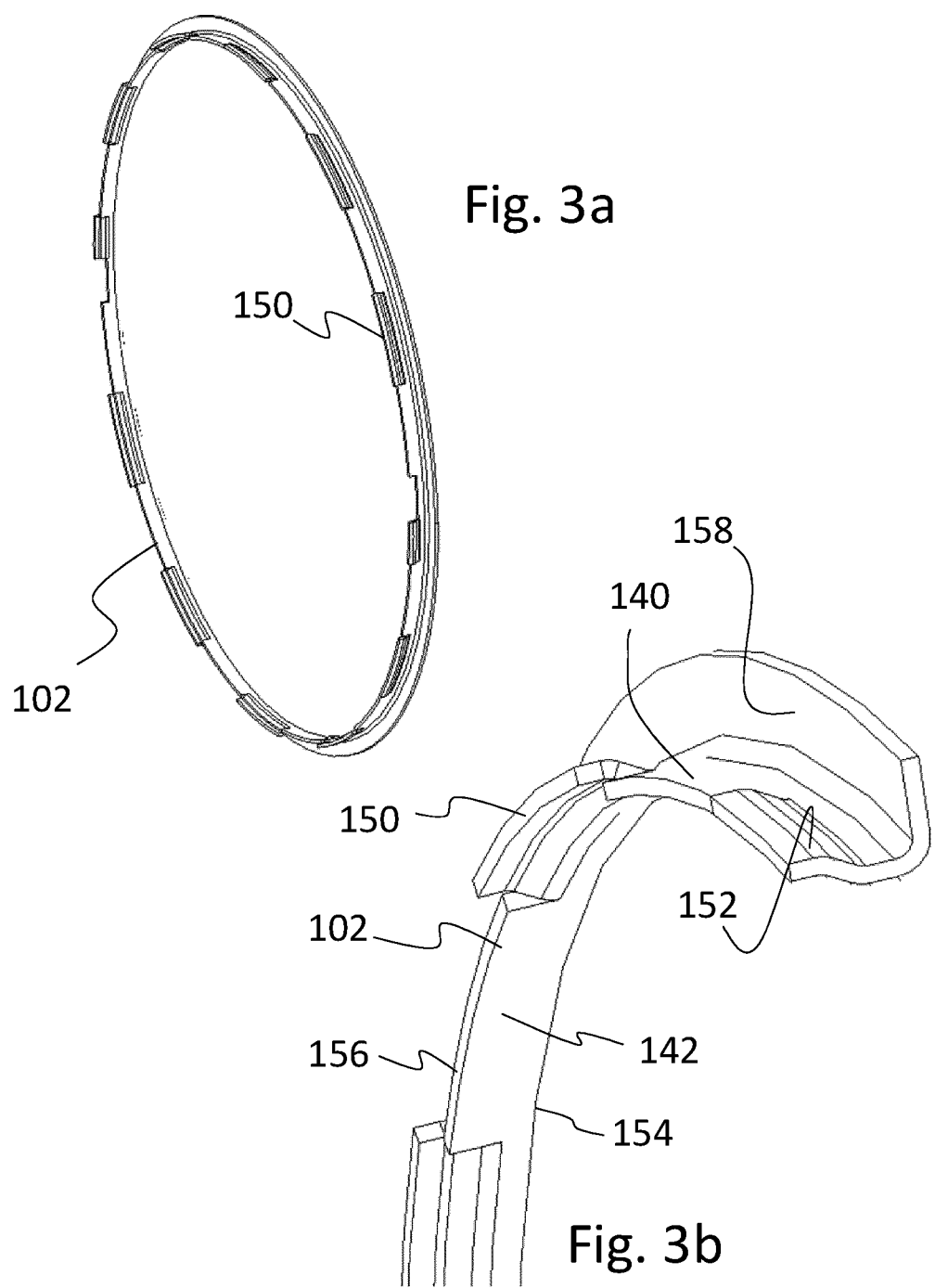

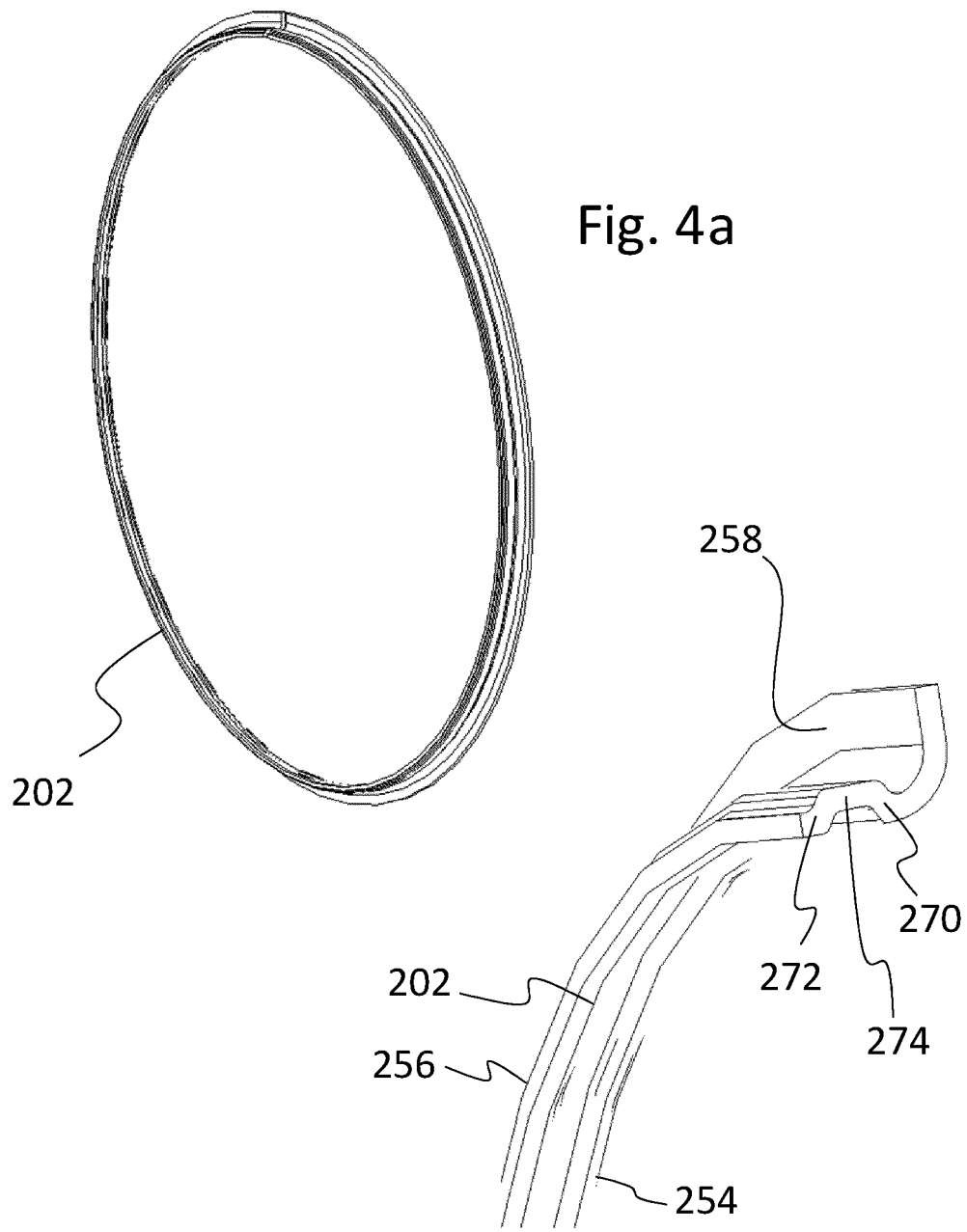

BRAKE DRUM SYSTEM FOR A WHEEL OF A VEHICLE

This application is a 35 USC 371 national phase filing of International Application No. PCT/EP2020/064867, filed May 28, 2020, which in turn claims priority to Indian Patent Application No. 201941022227, filed Jun. 4, 2019, the disclosures of which are incorporated herein by reference in their entireties.

TECHNICAL FIELD

The invention relates to a brake drum system for a wheel of a vehicle. The invention also relates to a vehicle comprising such a brake drum system.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Vehicle brakes are available in various configurations. One type of vehicle brake is a disc brake, in which a brake disc rotating with the road wheel axle is pinched between brake pads to slow down the rotation of the brake disc. Another type of vehicle brake is a drum brake, in which a brake drum is connected to a rotating wheel end hub of a roadwheel, and a friction-generating lining (e.g. provided on brake shoes) is pressed against an inner surface of the brake drum to slow down the rotation of the brake drum. With respect to drum brakes, it is a challenge to correctly align the brake drum when mounting it on the wheel end hub. An incorrect alignment may cause eccentric drum rotation, which in turn may result in steering wheel vibrations when a driver activates the brakes (for example by pressing a brake pedal). From a driver's point of view, such steering wheel vibrations may cause irritation.

U.S. Pat. No. 3,027,980 discloses a solution to concentrically aligning a brake drum with a wheel end hub. A bevelled ring is provided between the brake drum and the wheel end hub. The bevelled ring is pressed in an axial direction into indirect contact with the brake drum and wheel end hub under the action of a nut and washer. Thus, the nut has to be adequately tightened so that the applied axial force is turned into radial force by the bevelled ring for accomplishing proper alignment. Although U.S. Pat. No. 3,027,980 presents a solution to concentrically aligning brake drums, it would be desirable to simplify the alignment process.

SUMMARY

An object of the invention is to provide a brake drum system which allows for a simplified alignment between a brake drum and a wheel end hub.

According to a first aspect of the invention, the object is achieved by a brake drum system for a wheel of a vehicle, in accordance with claim 1. Thus, according to the first aspect of the invention, there is provided a brake drum system for a wheel of a vehicle, comprising
- a brake drum rotatable with the wheel, the brake drum having an inner surface adapted to receive a friction-generating lining when a driver applies the brakes of the vehicle,
- a wheel end hub adapted to be located radially between a drive axle of the vehicle and the brake drum, and
- a substantially circular spring element for concentrically aligning the brake drum with the wheel end hub, the spring element being adapted to be clamped between the brake drum and the wheel end hub for providing a radially directed spring force, wherein the spring element has an outer surface adapted to be pressed against the brake drum and an inner surface adapted to be pressed against the wheel end hub.

By the provision of a brake drum system which comprises a radially pressing spring element a simple aligning process is achieved. Thus, the invention is based on the insight that by using a substantially circular spring element, a radial aligning force may inherently be present in the spring element itself. This will retain the geometrical centre axis of the brake drum in its position during mounting. The spring element, or at least parts of it, may suitably be radially compressed when it is clamped between the brake drum and the wheel end hub, thus urging to expand in the radial direction. In the mounted state of the system, the brake drum, the substantially circular spring element and the wheel end hub are concentrically arranged relative to each other.

The various directions of extensions of the components of the brake drum system may be described based on a cylindrical r, θ, z-coordinate system, wherein the coordinate r defines the radial direction, the coordinate θ defines the circumferential/angular direction and the coordinate z defines the axial direction. Thus, according to the invention, in an assembled state of the brake drum system, following the r-direction, the spring element is located radially outside of the wheel end hub, and the brake drum is located radially outside of the spring element. When the vehicle is in motion, e.g. is driven on a road, the rotational motion of the brake drum is in the θ-direction.

The brake drum and the wheel end hub may suitably comprise respective pilot surfaces for piloting the brake drum onto the wheel end hub, when the brake drum is in the process of becoming mounted to the wheel end hub in the axial direction. A pilot surface of the brake drum may suitably face radially inwardly, while a pilot surface of the wheel end hub may suitably face radially outwardly. The spring element may suitably be clamped between the pilot surfaces of the brake drum and the wheel end hub. Suitably the pilot surface of the brake drum may be profiled to conform with or at least partly conform with a cross-sectional profile of the spring element.

According to at least one exemplary embodiment, the spring element has the form of an open ring with two end portions facing each other. This is advantageous since an spring element in the form of an open ring is oftentimes easies to manufacture than a spring element in the form of a closed ring. However, it should be understood that, in at least some exemplary embodiments, the brake drum system may comprise a spring element in the form of a closed ring, instead of an open ring. With respect to the exemplary embodiments in which the spring element is in the form of an open ring having two end portions facing each other, there are different conceivable configurations for how they face each other. In at least some exemplary embodiments, the two end portions may face each other in the circumferential direction, i.e. the θ-direction. In other exemplary embodiments, the two end portions may be overlapping such that the open ring extends slightly more than 360°. In such case, one of the end portions may be located radially outside of the other end portion, thus facing each other in the r-direction. In such an overlapping configuration, each individual end portion may suitably be thinner than the major portion of the ring, so that the thickness at the overlap substantially corresponds to the thickness at the major portion of the ring.

According to at least one exemplary embodiment, discrete portions of the outer surface of the spring element are in contact with the brake drum for providing said radially directed spring force when the system has been assembled, wherein the discrete portions are separated from each other and distributed along the circular circumferential direction of the spring element. By providing discrete portions along the circumference of the spring element, i.e. along the θ-direction, an efficient spring effect is created in different radial directions, thereby improving the concentric alignment. In at least some exemplary embodiments, the discrete portions may suitably be symmetrically distributed around the spring element. In at least some exemplary embodiments, the discrete portions may be resilient, wherein they become compressed when the spring element is clamped between the brake drum and the wheel end hub. Such compressed discrete portion may urge to return to a non-compressed state, i.e. each discrete portion pressing the brake drum in a respective radial direction. The number of discrete portions may be different in different exemplary embodiments. For instance, the number of discrete portions may be three, four, five, six, seven, eight, nine, ten, eleven, twelve, or even more.

According to at least one exemplary embodiment, the spring element comprises a plurality of profiled portions for providing said radially directed spring force, each profiled portion having a profile bulging radially outwardly against the brake drum and being spaced from the wheel end hub when the system has been assembled. By providing radially bulging profiled portion an efficient spring effect is created in different radial directions, thereby improving the concentric alignment. Suitably, the profiled portions are resilient so that when the brake drum is mounted in order to clamp the spring element, the profiled portions become pressed towards the wheel end hub, whereby the profiled portions will exert a radially outwardly directed counterforce against the brake drum. The profiled portions may in at least some exemplary embodiments form part of or comprise the above-mentioned discrete portions.

According to at least one exemplary embodiment, said profile is U-shaped, the legs of the U-shape being adapted to be pressed against the wheel end hub and the interconnecting bridge of the U-shape being adapted to be pressed against the brake drum. By having a U-shaped profile the bridge of the U-shape may be pressed downwardly because of the clamping force, and the bridge will thus provide a counterforce striving to push the brake drum in a radially outwards direction.

According to at least one exemplary embodiment, the legs of the U-shaped profile are separated from each other in the circumferential direction of the spring element. This allows a simple production of a spring element with U-shaped profiled portions. Furthermore, it allows a large variation of possible U-shaped configurations. Thus, because of the separation of the legs in the circumferential direction, it is possible to choose a large interconnecting bridge between the legs, if desired. If the separation is in the axial direction, the width of the spring element is a limiting factor for designing the interconnecting bridge of the U-shaped profile.

Nevertheless, an axial separation of the legs of a U-shaped profile may also be conceivable. This is reflected in at least one exemplary embodiment, according to which the spring element has a substantially constant profiled cross-section, wherein said profiled cross-section is U-shaped, the legs of the U-shape being adapted to be pressed against the wheel end hub and the interconnecting bridge of the U-shape being adapted to be pressed against the brake drum, wherein the legs of the U-shape are separated from each other in the axial direction of the circular spring element. This is advantageous it is simple to manufacture a circular ring with a constant cross-section.

According to at least one exemplary embodiment, the spring element is provided with a plurality of central slits extending and being distributed in the circumferential direction, wherein U-shaped bulges are provided on either side of each slit, whereby under the inner surface of the spring element an open space extends across the spring element from one lateral side to the other lateral side of the spring element when the system has been assembled. By providing a central slit, an improved resiliency of the U-shaped bulges is obtainable.

According to at least one exemplary embodiment, the spring element comprises a plurality of raised wings forming said profiled portions, the wings being distributed along the circumference of the spring element and being adapted to be pressed against the brake drum. By designing the profiled portions as raised wings, a good resiliency is obtainable.

According to at least one exemplary embodiment, said discrete portions comprise a plurality of pairs of discrete portions, each pair of discrete portions comprising a discrete portion on either side of a slot, wherein each discrete portion in such a pair of discrete portions project radially outwardly and towards a centre of the slot. By having such raised discrete portions, they will become pressed downwardly when the spring element is clamped between the brake drum and the wheel end hub, and will thus exert a an radially outwardly directed counterforce on the brake drum.

According to at least one exemplary embodiment, one of the lateral sides of the spring element is formed by a radially outwardly projecting ledge. This is advantageous since the ledge may function as a stop, preventing the spring element to accidently slide off the wheel end hub. In some exemplary embodiments, the ledge may, for instance, extend into a slit in one of (or both of) the brake drum and the wheel end hub. In other exemplary embodiments, it may be clamped between the brake drum and the wheel end hub, such as for instance reflected in the following exemplary embodiment.

According to at least one exemplary embodiment, when the system has been assembled, the projecting ledge is clamped between radially extending wall portions of the brake drum and the wheel end hub. By clamping the ledge between radially extending wall portions a firm fixation of the spring element is obtainable.

According to at least one exemplary embodiment, the spring element is made of one or more materials selected from the group consisting of:
  metal,
  plastic,
  rubber, and
  composite material.

The above mentioned materials may provide the desired resiliency of the spring element. Furthermore, it should be understood that in some exemplary embodiment, the entire spring element may be resilient, such as radially compressible and biased to return to its original shape/size by radial expansion. In other exemplary embodiments, only portions, such as discrete portions are resilient and be biased to return to their original shape by radial expansion after having been compressed. In yet other exemplary embodiments, the discrete portions (such as profiled portions) and other portions of the spring element may both be resilient and biased to return to their original shape.

According to a second aspect of the invention, the object is achieved by a vehicle comprising a brake drum system according to the first aspect, including any embodiments thereof.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3a-3d illustrate a brake drum system, and a spring element for use in the brake drum system, in accordance with at least one exemplary embodiment of the invention, FIGS. 4a-4d illustrate a brake drum system, and a spring element for use in the brake drum system, in accordance with at least another exemplary embodiment of the invention.

DETAILED DESCRIPTION OF EXAMPLE EMBODIMENTS OF THE INVENTION

Figure 1:
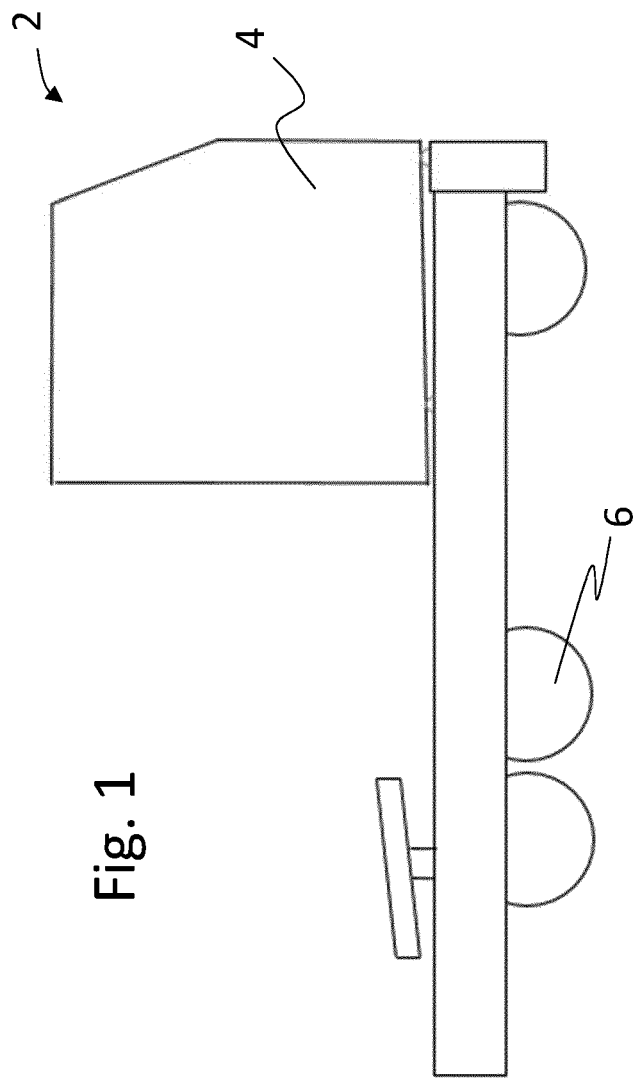
FIG. 1 is a schematic illustration of a vehicle, in accordance with at least one exemplary embodiment of the invention.

FIG. 1 is a schematic illustration of a vehicle 2, in accordance with at least one exemplary embodiment of the invention. Although the vehicle 2 is illustrated in the form of a truck, other types of vehicles, such as busses, construction equipment, trailers or passenger cars may be provided in accordance with the invention.

The truck (vehicle) comprises a cab 4 in which a driver may operate the vehicle. The vehicle comprises a number of road wheels 6, herein illustrated as three pairs of wheels, however in other embodiments there may be a different number of wheels, such as two pairs, four pairs or more. In the cab 4 a driver may press a brake pedal with his/her foot in order to activate the brake or brakes. Activation of the brake causes friction-generating linings (such as on multiple brake shoes) to be pressed against an inner surface of a brake drum (not illustrated in FIG. 1) connected to the road wheels 6.

Figure 2:
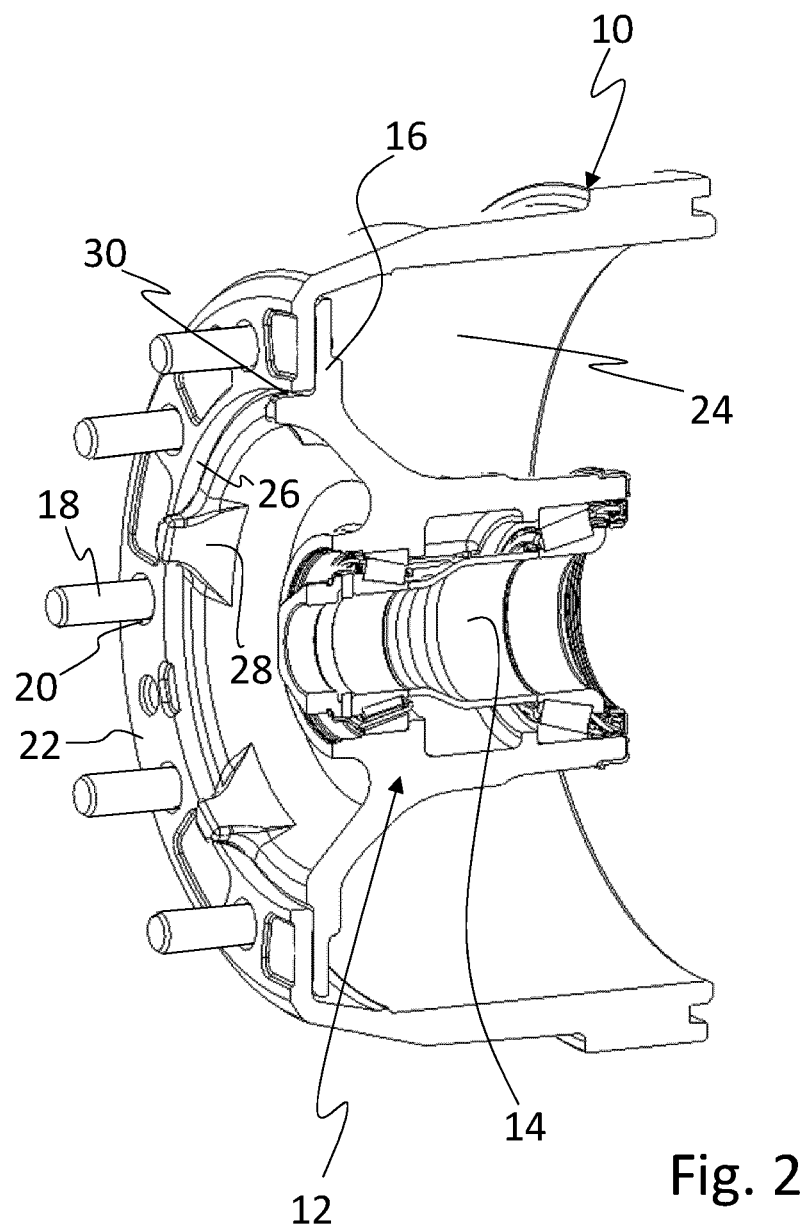
FIG. 2 is a general illustration, partly in cross-section, of a brake drum mounted on a wheel end hub.

FIG. 2 is a general illustration, partly in cross-section, of a brake drum 10 mounted on a wheel end hub 12. The wheel end hub 12 has a central axle-receiving portion 14 for receiving a drive axle (not shown) of a vehicle. A drum-receiving flange portion 16 of the wheel end hub 12 projects radially from the central portion 14. The flange portion 16 is provided with a plurality of studs 18 for mating with corresponding holes 20 in a flange portion 22 of the brake drum 10. The brake drum 10 has an inner surface 24 adapted to receive a friction-generating lining (not shown) when a driver applies the brakes of the vehicle. The flange 22 of the brake drum 10 has a pilot surface 26 facing radially inwardly. The flange portion 16 of the wheel end hub 12 comprises axially projecting pilot portions 28, having pilot surfaces 30 facing radially outwardly. The pilot surfaces 26, 30 of the brake drum 10 and the wheel end hub 12 are provided for aligning the brake drum 10 with the wheel end hub 12. It is nevertheless a challenge to achieve a correct alignment.

The inventors of the present invention have solved the alignment problem by providing a brake drum system in which a spring element is clamped between a brake drum and a wheel end hub, wherein the spring element exerts a radially directed force onto the brake drum for proper alignment. Some exemplary embodiments will be discussed in the following.

Figure 3C:
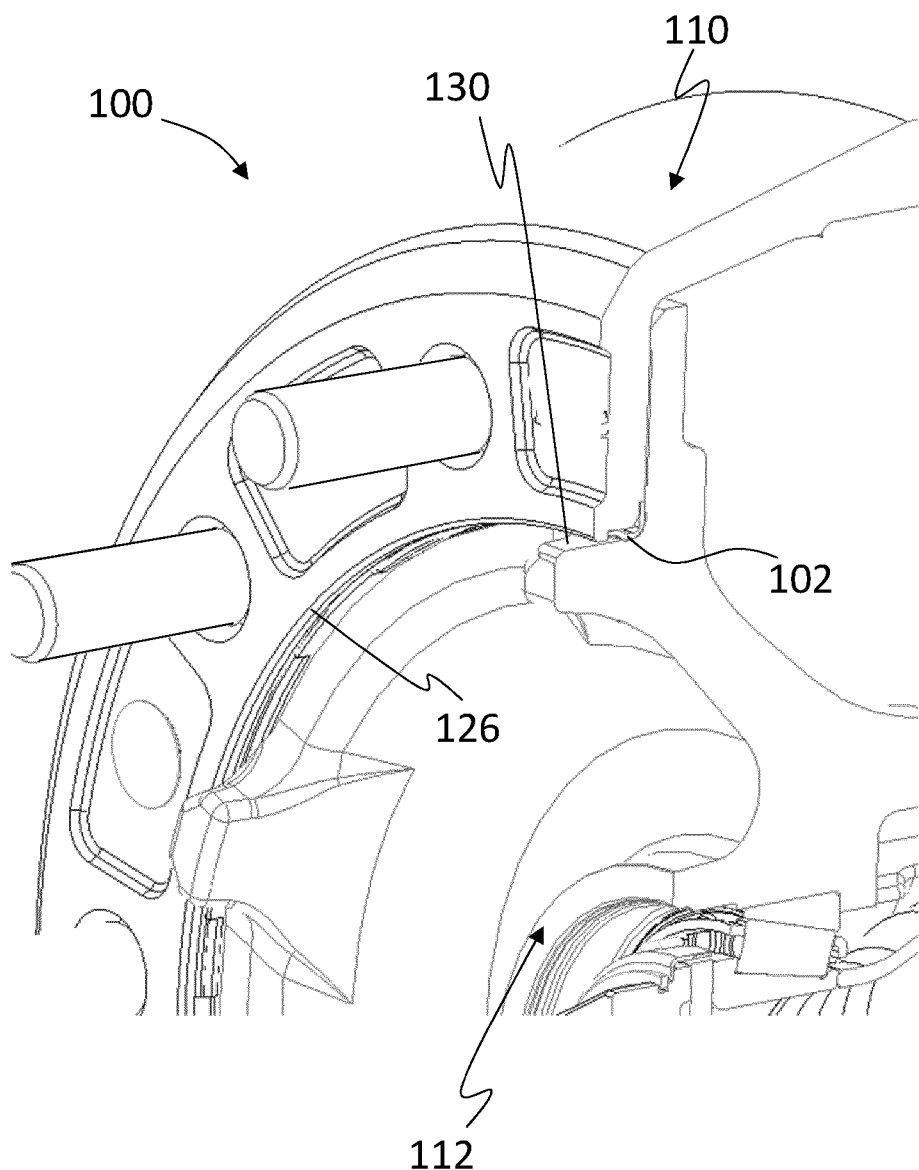
Figure 3D:
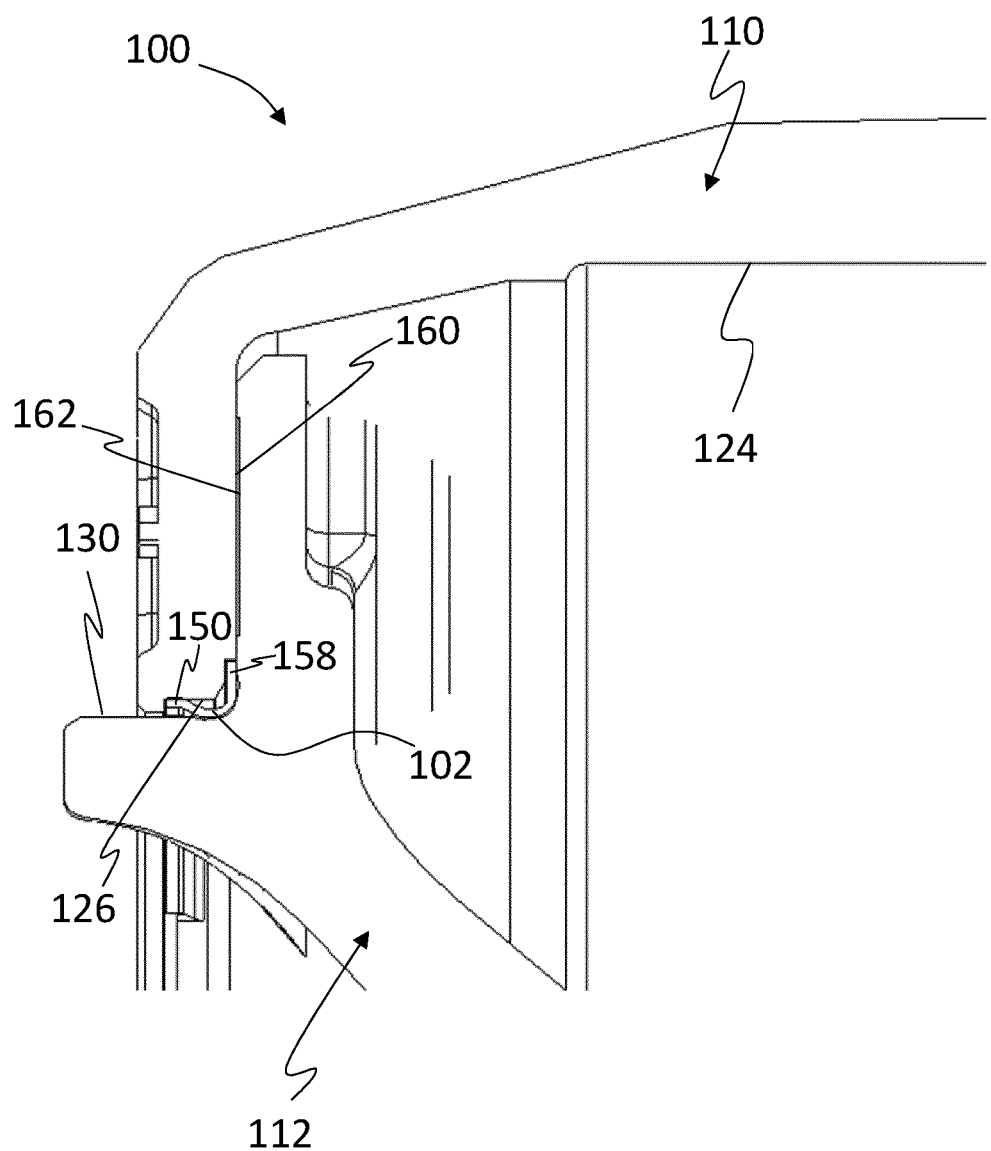

FIGS. 3a-3d illustrate a brake drum system 100, and a spring element 102 for use in the brake drum system 100, in accordance with at least one exemplary embodiment of the invention. FIG. 3a illustrates the spring element 102 for use in the brake drum system 100. FIG. 3b is a detailed view illustrating a cross-section of the spring element 102. FIG. 3c illustrates, partly in cross-section, the spring element 102 mounted and clamped between the brake drum 110 and the wheel end hub 112. FIG. 3d illustrates, in a cross-sectional view, the spring element 102 mounted and clamped between the brake drum 110 and the wheel end hub 112.

As shown in FIG. 3b, the brake drum 110 has an has an inner surface 124 adapted to receive a friction-generating lining (not shown) when a driver applies the brakes of the vehicle.

As best seen in FIG. 3a, the spring element 102 is substantially circular, and as best seen in FIG. 3b, the spring element 102 has an outer surface 140 adapted to be pressed against the brake drum 110 and an inner surface 142 adapted to be pressed against the wheel end hub 112. When clamped between the brake drum 110 and the wheel end hub 112, the spring element 102 provides a radially directed spring force. The spring element 102 may have the form of an open ring with two end portions facing each other, or it may have the form of a closed ring without any end portions.

As best seen in FIG. 3b, the spring element comprises a plurality of discrete portions 150. These discrete portions 150, on the outer surface 140 of the spring element 102, configured to be in contact with the brake drum 110 for providing said radially directed spring force when the system 100 has been assembled. The discrete portions 150 are separated from each other and distributed along the circular circumferential direction of the spring element 102. The discrete portions 150 may suitably be clamped between pilot surfaces 126, 130 of the brake drum 110 and the wheel end hub 112, respectively, such as illustrated in FIGS. 3c and 3d.

Turning back to FIGS. 3a and 3b, the discrete portions 150 have a wing-shaped profile. The discrete portions (profiled portions) bulge radially outwardly. When applied in the brake drum system 100, the bulge 152 of the profile will be spaced from the wheel end hub 112, and will be pressed against the brake drum 110. The void space underneath the bulge 152 allows brake drum 110 to press/compress the bulge 152 radially inwardly towards the wheel end hub 152. The resiliency and the bias of the spring element 102 will cause the bulge 152 to urge towards its original shape, i.e. providing a radial outwardly directed force onto the brake drum 110. Since the discrete portions 150 and the bulges 152 are distributed around the circumference of the spring element 102, the brake drum 110 will be subjected to such a force in several radial directions, thereby aligning the brake drum 110 properly. The discrete portions 150 in FIGS. 3a-3d (and in other embodiments disclosed herein) are suitably equidistantly distributed along the spring element 102.

As best seen in FIG. 3b, the spring element 102 has two lateral edges 154, 156. One of the lateral sides 154 of the spring element 102 is formed by a radially outwardly projecting ledge 158. The lateral sides 154, 156 of the spring element 102 are separated from each other in the axial direction of the spring element 102. When the drum brake system 100 has been assembled, the projecting ledge 158 is clamped between radially extending wall portions 160, 162 of the brake drum 110 and the wheel end hub 112, respectively. This is best seen in FIG. 3d. The ledge 158 functions as a stop in order to reduce the risk of the spring element 102 falling off the wheel end hub 112. Thus, as can be seen in FIG. 3d, the spring element 102 will be clamped between the pilot surfaces 126, 130 of the brake drum 110 and the wheel end hub 112, and will also be clamped between radially extending wall portions 160, 162 of the brake drum 110 and the wheel end hub 112. The discrete portions 150 of the spring element 102 will thus be clamped in the radial direction, while the ledge 158 will be clamped in the axial direction.

Figure 4C:
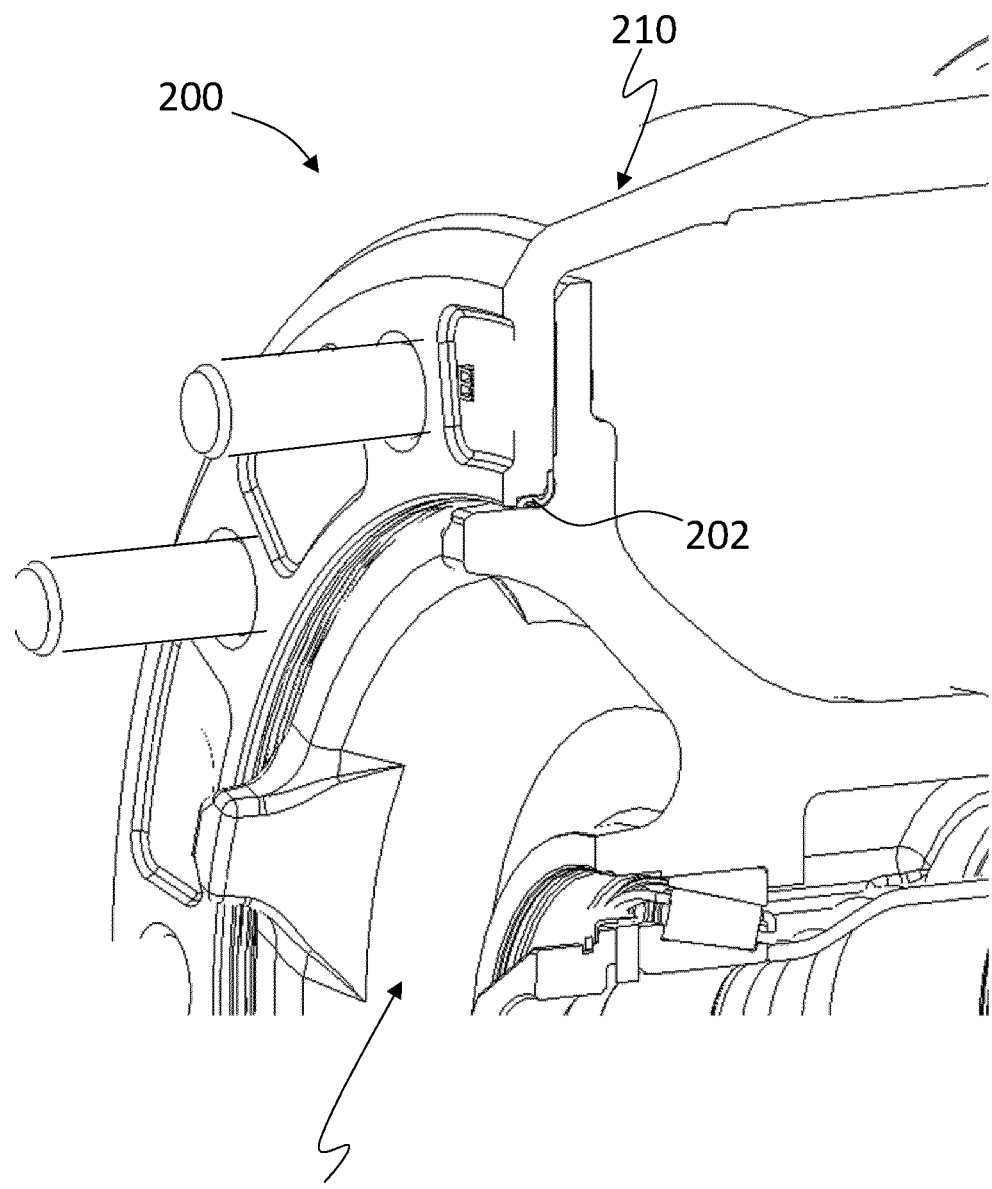
Figure 4D:
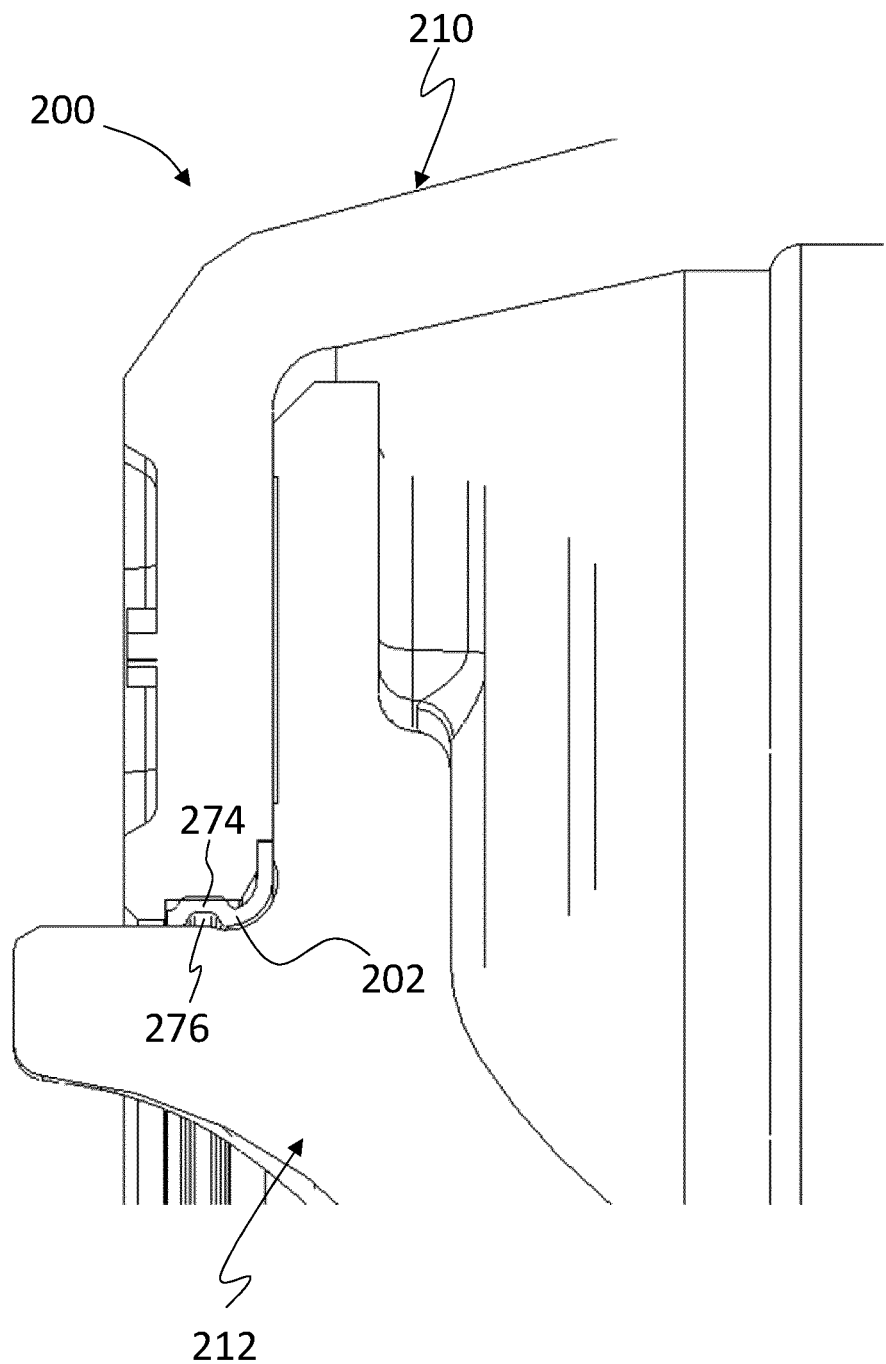

FIGS. 4a-4d illustrate a brake drum system 200, and a spring element 202 for use in the brake drum system 200, in accordance with at least another exemplary embodiment of the invention. FIG. 4a illustrates the spring element 202 for use in the brake drum system 200. FIG. 4b is a detailed view illustrating a cross-section of the spring element 202. FIG. 4c illustrates, partly in cross-section, the spring element 202 mounted and clamped between the brake drum 210 and the wheel end hub 212. FIG. 4d illustrates, in a cross-sectional view, the spring element 202 mounted and clamped between the brake drum 210 and the wheel end hub 212.

The spring element 202 shown in FIGS. 4a-4d has a ledge 258 similarly to the spring element 202 in FIGS. 3a-3d, and provides the corresponding stopping function, improving the keeping of the spring element 202 in place. Furthermore, the spring element 202 shown in FIGS. 4a-4d may either form an open ring or a closed ring.

Unlike FIGS. 3a-3d, the spring element 202 shown in FIGS. 4a-4d does not have such discrete profiled portions (cf. reference numeral 150 in FIG. 3). Instead, the spring element 202 in FIGS. 4a-4d has a substantially constant profiled cross-section. The profiled cross-section is U-shaped, wherein the legs 270, 272 of the U-shape are adapted to be pressed against the wheel end hub 212 and the interconnecting bridge 274 (bulge) of the U-shape is adapted to be pressed against the brake drum 210. The legs 270, 272 of the U-shape are separated from each other in the axial direction of the substantially circular spring element 202. Thus, one leg 270 extends from the interconnecting bridge 274 of the U-shape towards the lateral side 254 having the ledge 258, while the other leg 272 extends towards the opposite lateral side 256. As best seen in FIG. 4d, there is a void space 276 underneath the interconnecting bridge 274 of the U-shaped profile allowing the brake drum 210 to radially press/compress the interconnecting bridge 274 towards the wheel end hub 212. The interconnecting bridge 274 of the U-shaped profile will thus be biased towards recovering its original shape and exert a radially directed counterforce on the brake drum 210.

Figure 5A:
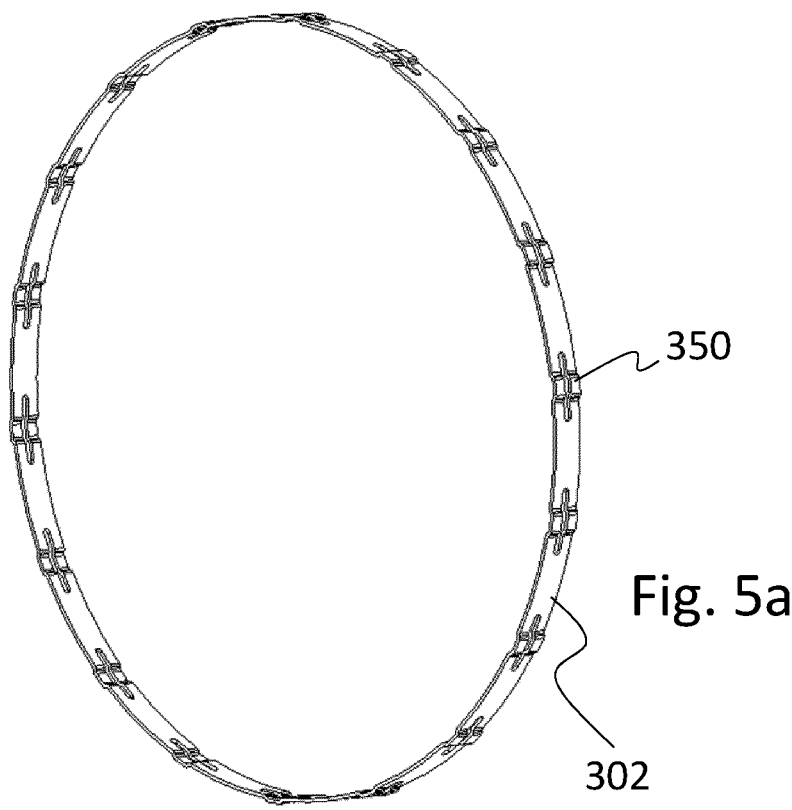
FIGS. 5a-5d illustrate a brake drum system, and a spring element for use in the brake drum system, in accordance with at least yet another exemplary embodiment of the invention.
Figure 5B:
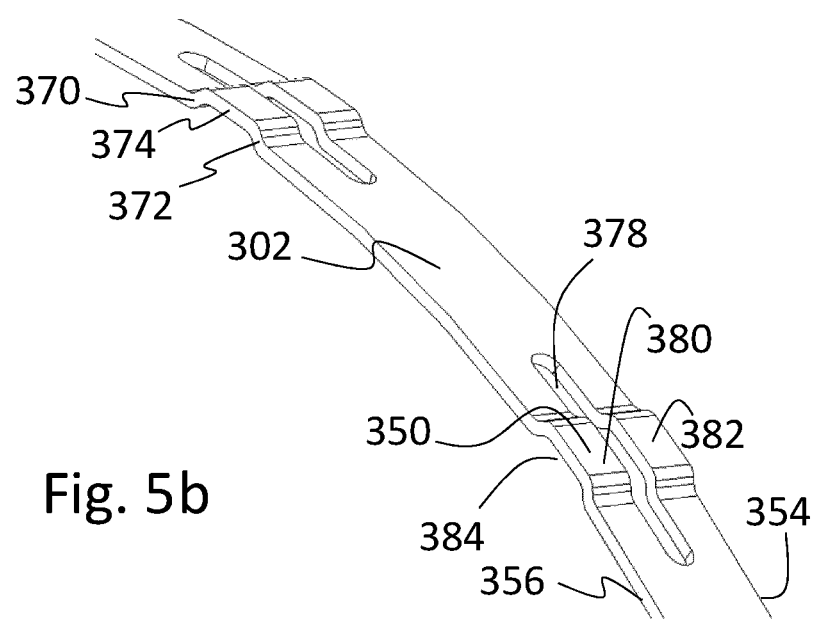
Figure 5C:
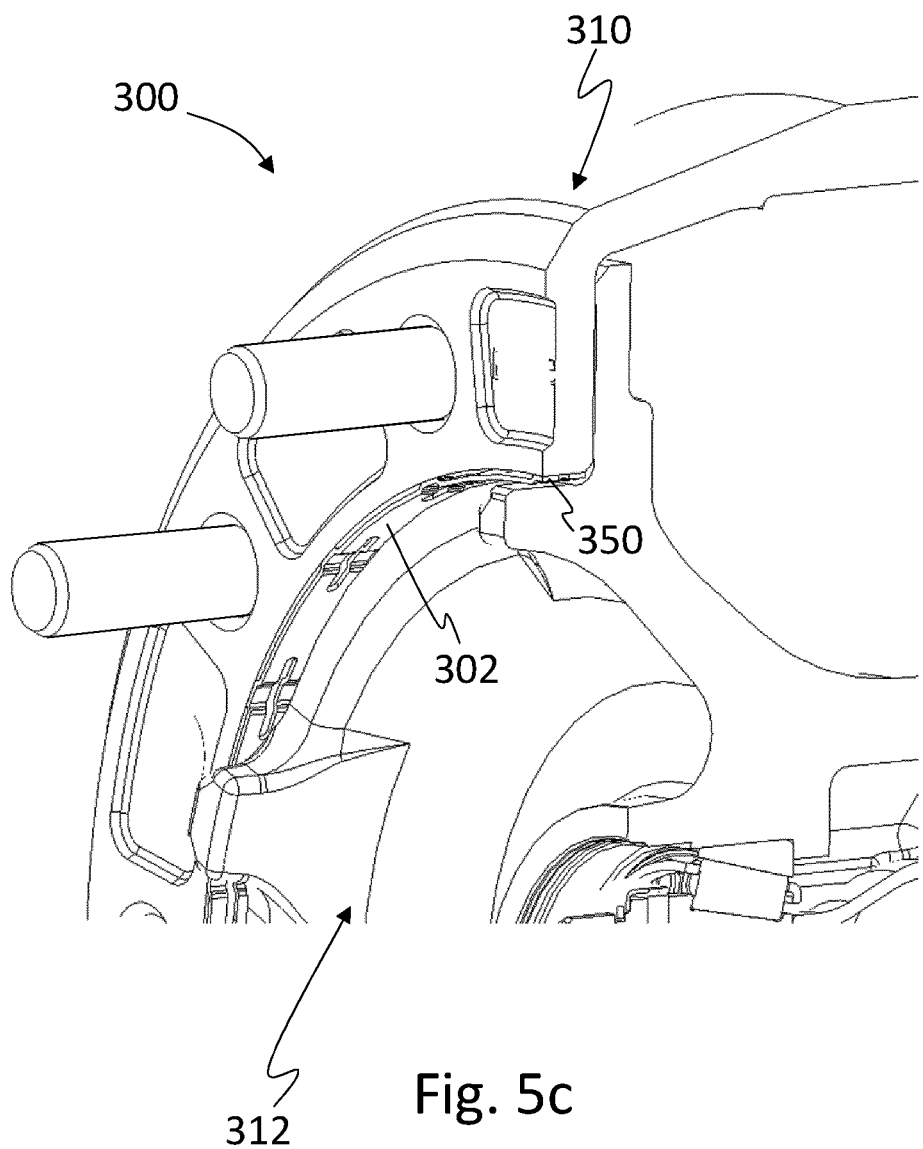
Figure 5D:
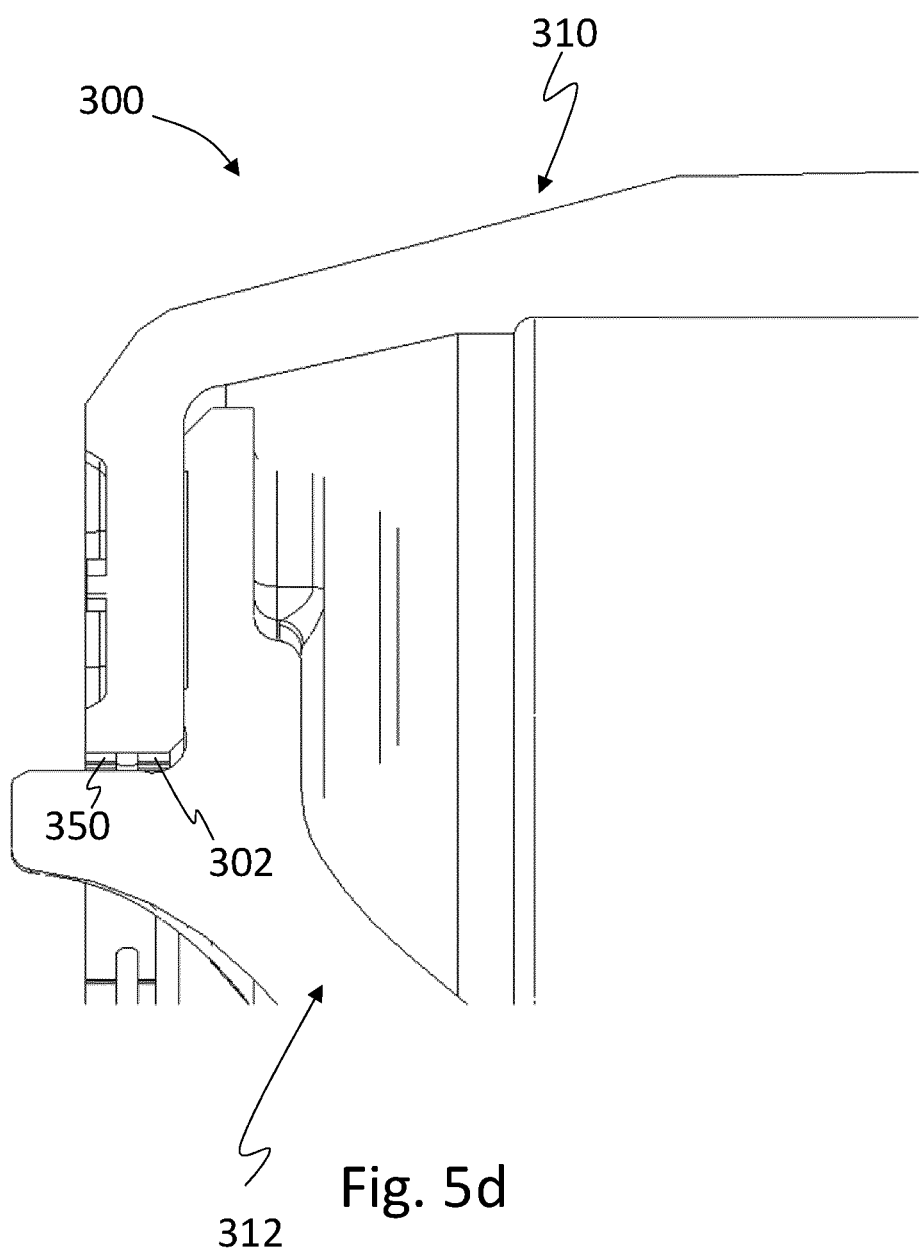

FIGS. 5a-5d illustrate a brake drum system 300, and a spring element 302 for use in the brake drum system 300, in accordance with at least yet another exemplary embodiment of the invention. FIG. 5a illustrates the spring element 302 for use in the brake drum system 300. FIG. 5b is a detailed view illustrating a cross-section of the spring element 302. FIG. 5c illustrates, partly in cross-section, the spring element 302 mounted and clamped between the brake drum 310 and the wheel end hub 312. FIG. 5d illustrates, in a cross-sectional view, the spring element 302 mounted and clamped between the brake drum 310 and the wheel end hub 312.

Although the spring element 302 shown in FIGS. 5a-5d does not have a ledge at a lateral side as in the embodiments illustrated in FIGS. 2a-2d and 3a-3d, it should be understood that in other exemplary embodiments, the spring element 302 shown in FIGS. 5a-5d may be modified to include such a ledge at a lateral side of the spring element. Conversely, it is conceivable, at least in some exemplary embodiments, to modify the spring element illustrated in FIGS. 2a-2d and 3a-3d by removing the ledge.

As best seen in FIGS. 5a and 5b, the spring element 302 comprises a plurality of profiled portions 350 for providing the radially directed spring force to the brake drum 310, each profiled portion 350 having a profile bulging radially outwardly against the brake drum 310 and being spaced from the wheel end hub 312 when the system 300 has been assembled (see FIGS. 5c and 5d). The profile is U-shaped, wherein the legs 370, 372 of the U-shape are adapted to be pressed against the wheel end hub 312 and the interconnecting bridge 374 of the U-shape is adapted to be pressed against the brake drum 310. The legs 370, 372 of the U-shaped profile are separated from each other in the circumferential direction of the spring element 302. The spring element 302 is provided with a plurality of central slits 378 extending and being distributed in the circumferential direction, wherein the U-shaped profile is configured as U-shaped bulges 380, 382 provided on either side of each slit 378, whereby under the inner surface of the spring element an open space 384 extends across the spring element 302 from one lateral side 354 to the other lateral side 356 of the spring element 302 when the system 300 has been assembled.

Figures 6A, 6B:
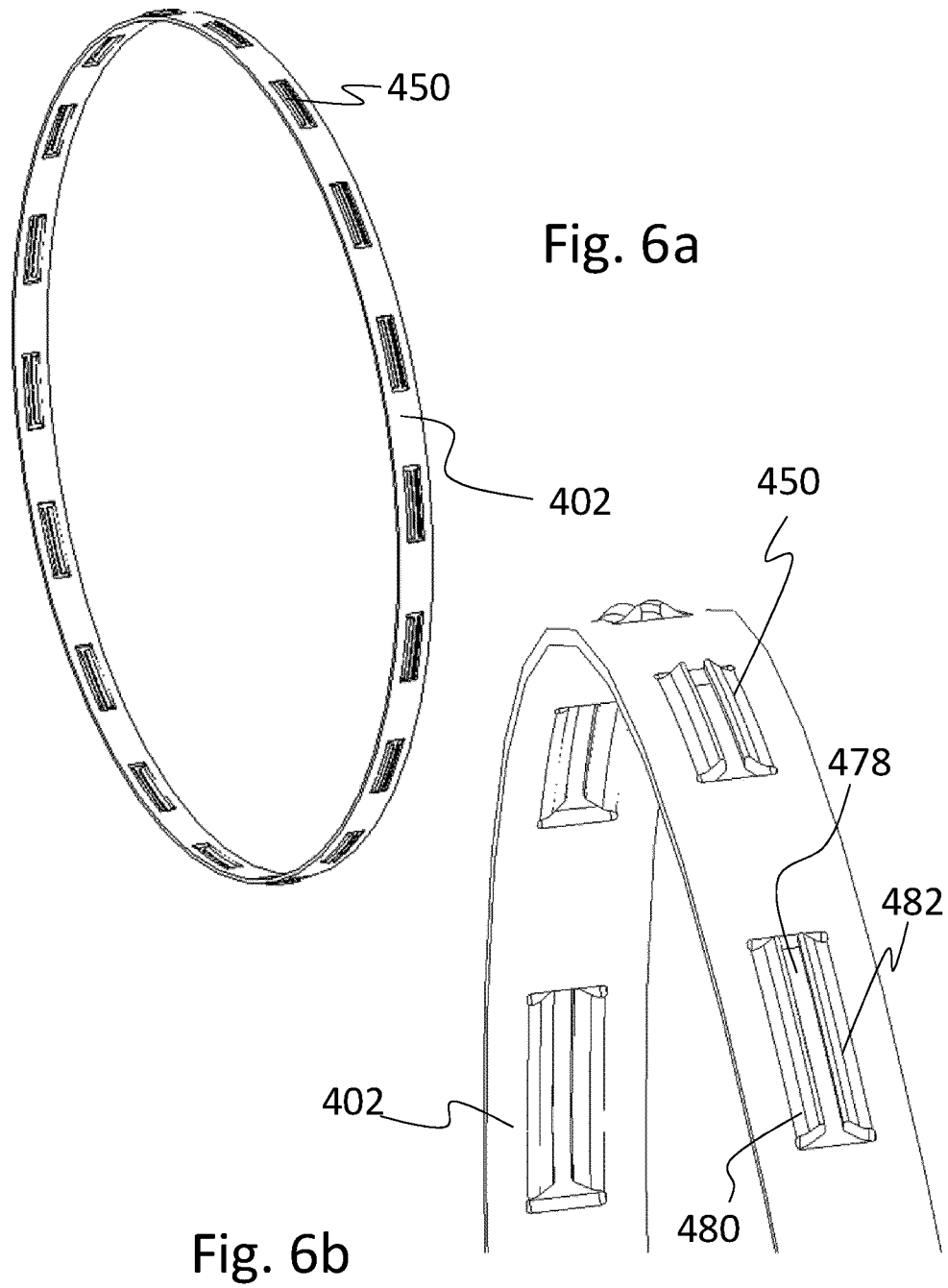
FIGS. 6a-6d illustrate a brake drum system, and a spring element for use in the brake drum system, in accordance with at least still another exemplary embodiment of the invention.
Figure 6C:
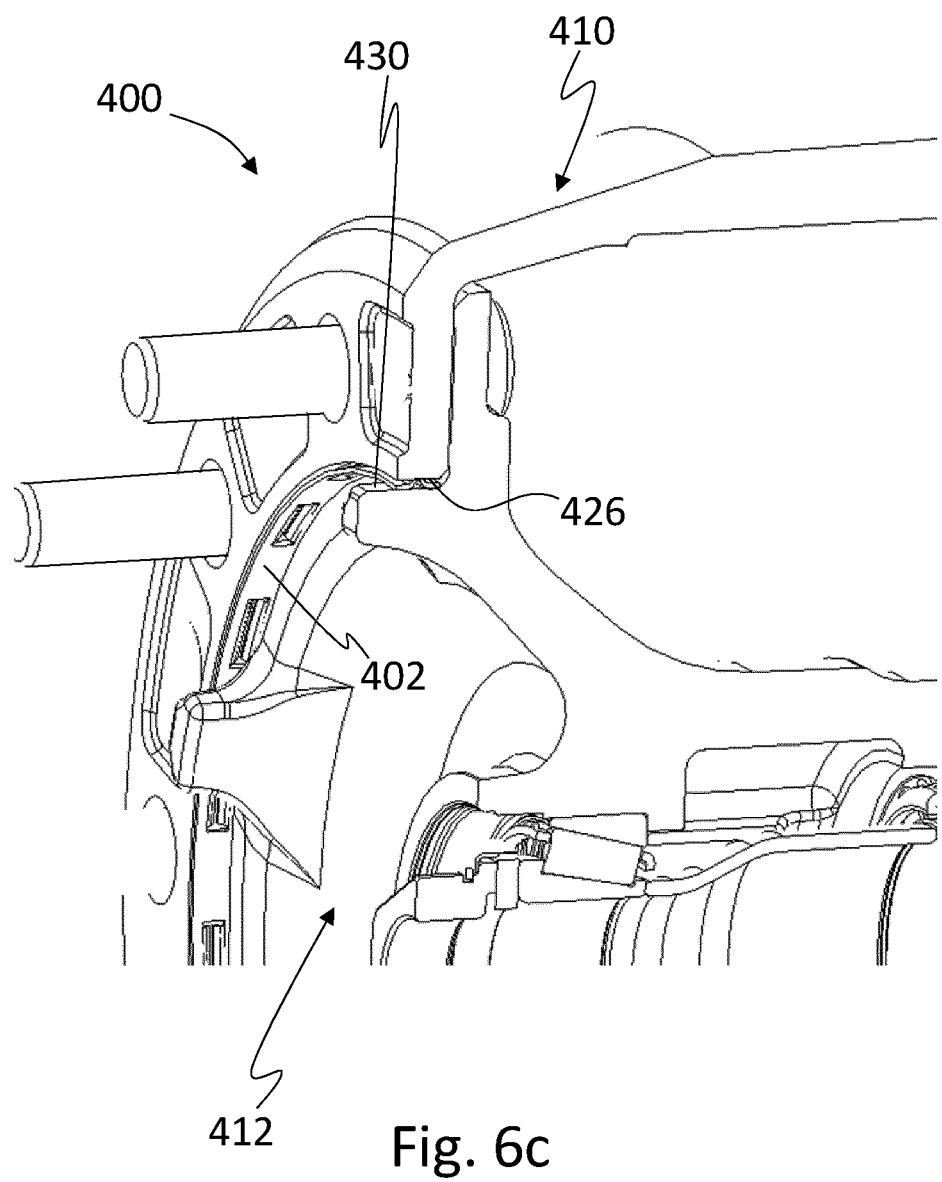
Figure 6D:
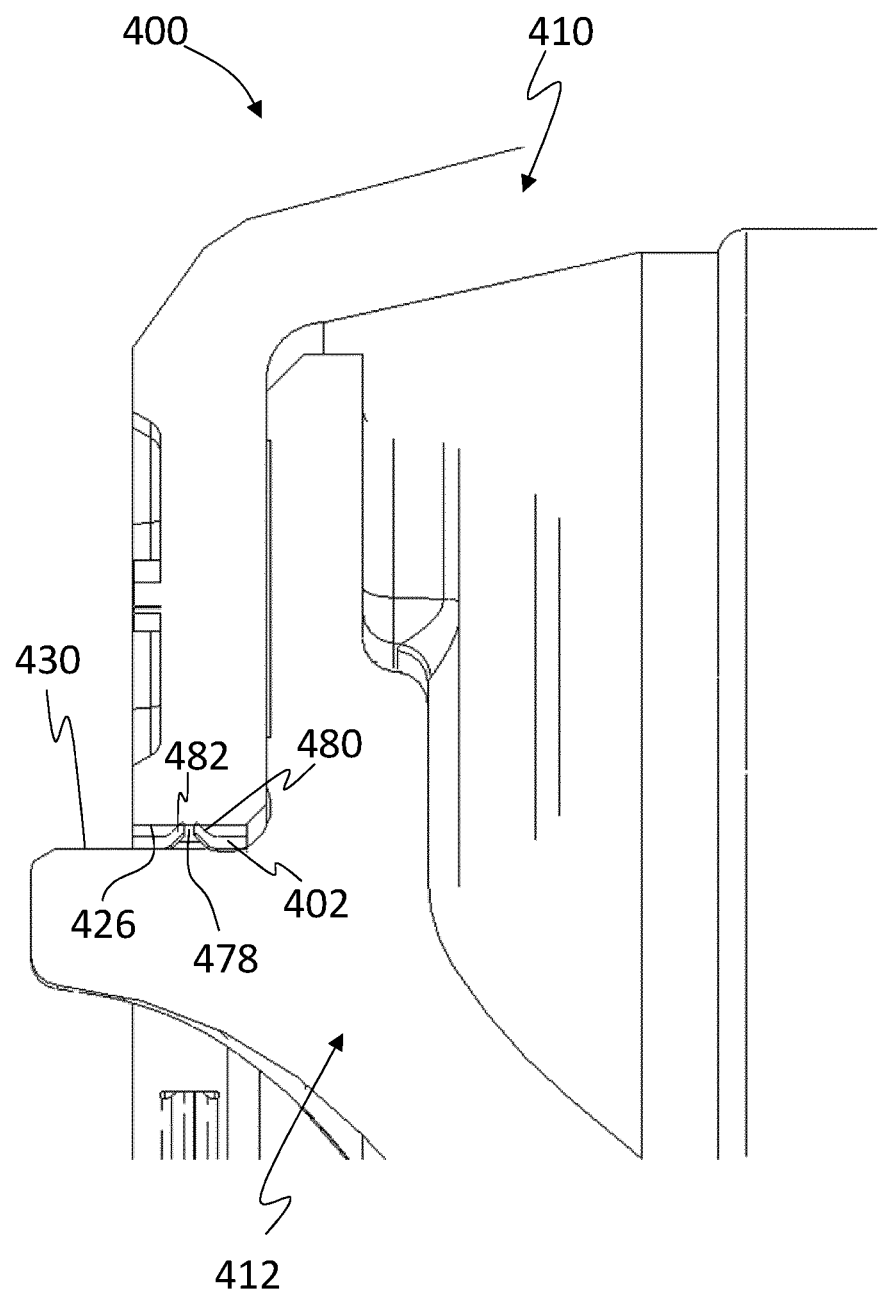

FIGS. 6a-6d illustrate a brake drum system 400, and a spring element 402 for use in the brake drum system 400, in accordance with at least still another exemplary embodiment of the invention. FIG. 6a illustrates the spring element 402 for use in the brake drum system 400. FIG. 6b is a detailed view illustrating a cross-section of the spring element 402. FIG. 6c illustrates, partly in cross-section, the spring element 402 mounted and clamped between the brake drum 410 and the wheel end hub 412. FIG. 6d illustrates, in a cross-sectional view, the spring element 402 mounted and clamped between the brake drum 410 and the wheel end hub 412.

Although the spring element 402 shown in FIGS. 6a-6d does not have a ledge at a lateral side as in the embodiments illustrated in FIGS. 2a-2d and 3a-3d, it should be understood that in other exemplary embodiments, the spring element 402 shown in FIGS. 6a-6d may be modified to include such a ledge at a lateral side of the spring element.

As best seen in FIG. 6b, the spring element 402 comprises a plurality of pairs 450 of discrete portions 480, 482, suitably equidistantly distributed along the circumference of the spring element 402. Each pair 450 of discrete portions comprises a discrete portion 480, 482 on either side of a slot 478, wherein each discrete portion 480, 482 in such a pair 450 of discrete portions project radially outwardly and towards a centre of the slot 478. In other words, in each pair 450, one 480 of the discrete portions extends in one axial direction towards the centre of the slot 478, while the other one 482 of the discrete portions extends in the opposite axial direction towards the centre of the slot 478. The oblique extension (due to both radial and axial extension) of the discrete portions 480, 482 provide for good resiliency. Thus, when clamped between the brake drum 410 and the wheel end hub 412, suitably between the pilot surfaces 426, 430 (see in particular FIG. 6*d*) of the brake drum 410 and the wheel end hub 412, the discrete portions 480 will be pressed radially inwardly towards the slot 478. The resiliency of the discrete portions 480, 482 will provide a counterforce directed radially outwardly on the brake drum 410, thus supporting a proper alignment of the brake drum 410 relative to the wheel end hub 412.

As can be seen in the different embodiments shown in FIGS. 3*d*, 4*d*, 5*d* and 6*d*, respectively, the cross-sectional profile of the pilot surface of the brake drum may suitably conform with, or at least partly conform with a cross-sectional profile of the spring element, including the cross-sectional profile of the above discussed discrete portions of the spring element.

It is to be understood that the present invention is not limited to the embodiments described above and illustrated in the drawings; rather, the skilled person will recognize that many changes and modifications may be made within the scope of the appended claims.

The invention claimed is:

1. A brake drum system for a wheel of a vehicle, comprising:
   a brake drum rotatable with the wheel, the brake drum having an inner surface adapted to receive a friction-generating lining when a driver applies brakes of the vehicle, and
   a wheel end hub adapted to be located radially between a drive axle of the vehicle and the brake drum, the wheel end hub comprising a substantially circular spring element for concentrically aligning the brake drum with the wheel end hub, the spring element being adapted to be clamped between the brake drum and the wheel end hub for providing a radially directed spring force, the spring element having an outer surface adapted to be pressed against the brake drum and an inner surface adapted to be pressed against the wheel end hub;
   wherein the spring element comprises a plurality of profiled portions for providing the radially directed spring force, each profiled portion having a profile bulging radially outwardly against the brake drum and being spaced from the wheel end hub when the brake drum system has been assembled; and
   wherein the profile is U-shaped, the legs of the U-shape being adapted to be pressed against the wheel end hub and the interconnecting bridge of the U-shape being adapted to be pressed against the brake drum.

2. The brake drum system of claim 1, wherein the spring element has the form of an open ring with two end portions facing each other.

3. The brake drum system of claim 1, wherein discrete portions of the outer surface of the spring element are in contact with the brake drum for providing the radially directed spring force when the brake drum system has been assembled, wherein the discrete portions are separated from each other and distributed along a circular circumferential direction of the spring element.

4. The brake drum system of claim 3, wherein the discrete portions comprise a plurality of pairs of discrete portions, each pair of discrete portions comprising a discrete portion on either side of a slot, wherein each discrete portion in such a pair of discrete portions project radially outwardly and towards a center of the slot.

5. The brake drum system of claim 1, wherein the legs of the U-shaped profile are separated from each other in a circumferential direction of the spring element.

6. The brake drum system of claim 5, wherein a lateral side of a plurality of lateral sides of the spring element is formed by a radially outwardly projecting ledge.

7. The brake drum system of claim 6, wherein, when the brake drum system has been assembled, the projecting ledge is clamped between radially extending wall portions of the brake drum and the wheel end hub.

8. The brake drum system of claim 1, wherein the spring element is provided with a plurality of central slits extending and being distributed in a circumferential direction, wherein U-shaped bulges are provided on either side of each slit, whereby under the inner surface of the spring element an open space extends across the spring element from one lateral side to the other lateral side of the spring element when the brake drum system has been assembled.

9. The brake drum system of claim 1, wherein the spring element has a substantially constant profiled cross-section, wherein the profiled cross-section is U-shaped, the legs of the U-shape being adapted to be pressed against the wheel end hub and the interconnecting bridge of the U-shape being adapted to be pressed against the brake drum, wherein the legs of the U-shape are separated from each other in an axial direction of the substantially circular spring element.

10. The brake drum system of claim 1, wherein the spring element comprises a plurality of raised wings forming the profiled portions, the wings being distributed along the circumference of the spring element and being adapted to be pressed against the brake drum.

11. The brake drum system of claim 1, wherein the spring element comprises at least one of:
   metal,
   plastic,
   rubber, and
   composite material.

12. A vehicle comprising:
   a wheel; and
   a brake drum system for the wheel, comprising:
      a brake drum rotatable with the wheel, the brake drum having an inner surface adapted to receive a friction-generating lining when a driver applies brakes of the vehicle, and
      a wheel end hub adapted to be located radially between a drive axle of the vehicle and the brake drum, the wheel end hub comprising a substantially circular spring element for concentrically aligning the brake drum with the wheel end hub, the spring element being adapted to be clamped between the brake drum and the wheel end hub for providing a radially directed spring force, the spring element having an outer surface adapted to be pressed against the brake drum and an inner surface adapted to be pressed against the wheel end hub;
      wherein the spring element comprises a plurality of profiled portions for providing the radially directed spring force, each profiled portion having a profile bulging radially outwardly against the brake drum and being spaced from the wheel end hub when the brake drum system has been assembled; and
      wherein the profile is U-shaped, the legs of the U-shape being adapted to be pressed against the wheel end hub and the interconnecting bridge of the U-shape being adapted to be pressed against the brake drum.

13. The vehicle of claim 12, wherein the spring element has the form of an open ring with two end portions facing each other.

14. The vehicle of claim 12, wherein discrete portions of the outer surface of the spring element are in contact with the brake drum for providing the radially directed spring force when the brake drum system has been assembled, wherein the discrete portions are separated from each other and distributed along a circular circumferential direction of the spring element.

15. A brake drum system for a wheel of a vehicle, comprising:
a brake drum rotatable with the wheel, the brake drum having an inner surface adapted to receive a friction-generating lining when a driver applies brakes of the vehicle; and
a wheel end hub adapted to be located radially between a drive axle of the vehicle and the brake drum, the wheel end hub comprising a substantially circular spring element for concentrically aligning the brake drum with the wheel end hub, the spring element being adapted to be clamped between the brake drum and the wheel end hub for providing a radially directed spring force, the spring element having an outer surface adapted to be pressed against the brake drum and an inner surface adapted to be pressed against the wheel end hub;
wherein the spring element is provided with a plurality of central slits extending and being distributed in a circumferential direction, wherein U-shaped bulges are provided on either side of each slit, whereby under the inner surface of the spring element an open space extends across the spring element from one lateral side to the other lateral side of the spring element when the brake drum system has been assembled.

16. A brake drum system for a wheel of a vehicle, comprising:
a brake drum rotatable with the wheel, the brake drum having an inner surface adapted to receive a friction-generating lining when a driver applies brakes of the vehicle; and
a wheel end hub adapted to be located radially between a drive axle of the vehicle and the brake drum, the wheel end hub comprising a substantially circular spring element for concentrically aligning the brake drum with the wheel end hub, the spring element being adapted to be clamped between the brake drum and the wheel end hub for providing a radially directed spring force, the spring element having an outer surface adapted to be pressed against the brake drum and an inner surface adapted to be pressed against the wheel end hub;
wherein the spring element has a substantially constant profiled cross-section, wherein the profiled cross-section is U-shaped, the legs of the U-shape being adapted to be pressed against the wheel end hub and the interconnecting bridge of the U-shape being adapted to be pressed against the brake drum, wherein the legs of the U-shape are separated from each other in an axial direction of the substantially circular spring element.

17. A brake drum system for a wheel of a vehicle, comprising:
a brake drum rotatable with the wheel, the brake drum having an inner surface adapted to receive a friction-generating lining when a driver applies brakes of the vehicle, and
a wheel end hub adapted to be located radially between a drive axle of the vehicle and the brake drum, the wheel end hub comprising a substantially circular spring element for concentrically aligning the brake drum with the wheel end hub, the spring element being adapted to be clamped between the brake drum and the wheel end hub for providing a radially directed spring force, the spring element having an outer surface adapted to be pressed against the brake drum and an inner surface adapted to be pressed against the wheel end hub;
wherein discrete portions of the outer surface of the spring element are in contact with the brake drum for providing the radially directed spring force when the brake drum system has been assembled, wherein the discrete portions are separated from each other and distributed along a circular circumferential direction of the spring element; and
wherein the discrete portions comprise a plurality of pairs of discrete portions, each pair of discrete portions comprising a discrete portion on either side of a slot, wherein each discrete portion in such a pair of discrete portions project radially outwardly and towards a center of the slot.

* * * * *